United States Patent
Bell

(10) Patent No.: US 6,773,746 B1
(45) Date of Patent: Aug. 10, 2004

(54) METHOD OF TEMPORARILY PROTECTING A SURFACE BY APPLICATION OF A COATING COMPOSITION HAVING A CARBOXYLIC ACID-CONTAINING POLYMER FILM-FORMING COMPONENT

(75) Inventor: Otis Franklin Bell, San Juan Capistrano, CA (US)

(73) Assignee: BAF Industries, Santa Ana, CA (US)

( * ) Notice: Subject to any disclaimer, the term of this patent is extended or adjusted under 35 U.S.C. 154(b) by 0 days.

(21) Appl. No.: 10/082,598

(22) Filed: Feb. 22, 2002

(51) Int. Cl.$^7$ .............................. B05D 1/32; B05D 1/36; B05D 7/16
(52) U.S. Cl. .................. 427/154; 427/156; 427/259; 427/272; 427/282
(58) Field of Search .............................. 427/154, 156, 427/256, 258, 259, 272, 282, 287; 524/556, 832; 525/330.2, 369, 386; 528/486, 489

(56) References Cited

U.S. PATENT DOCUMENTS

| | | | |
|---|---|---|---|
| 4,540,736 A | * 9/1985 | Herten et al. ................ 524/556 |
| 4,562,226 A | * 12/1985 | Coombes et al. ............ 524/767 |
| 5,143,949 A | * 9/1992 | Grogan et al. ............... 523/334 |
| 5,186,978 A | 2/1993 | Woodhall et al. |
| 5,194,483 A | * 3/1993 | Kawabata .................... 524/462 |
| 5,302,413 A | 4/1994 | Woodhall et al. |
| 5,362,786 A | 11/1994 | Woodhall et al. |
| 5,411,760 A | 5/1995 | Woodhall et al. |
| 5,453,459 A | * 9/1995 | Roberts ....................... 524/123 |
| 5,523,117 A | 6/1996 | Woodhall et al. |
| 5,550,182 A | * 8/1996 | Ely et al. ..................... 524/557 |
| 5,567,756 A | * 10/1996 | Swidler ....................... 524/389 |
| 5,603,992 A | 2/1997 | Woodhall et al. |
| 5,618,582 A | * 4/1997 | VanWinckel ................ 427/259 |
| 5,716,667 A | * 2/1998 | Kashiwada et al. ......... 427/156 |
| 5,719,221 A | * 2/1998 | Swidler ....................... 524/309 |
| 5,876,791 A | 3/1999 | Woodhall et al. |
| 6,011,107 A | * 1/2000 | Maxwell et al. ............ 524/566 |
| 6,117,485 A | 9/2000 | Woodhall et al. |
| 6,124,044 A | * 9/2000 | Swidler ....................... 428/500 |
| 6,391,961 B1 | * 5/2002 | Zajac .......................... 524/523 |

FOREIGN PATENT DOCUMENTS

WO WO 98/55535 A1 * 12/1998

* cited by examiner

Primary Examiner—Shrive P. Beck
Assistant Examiner—William Phillip Fletcher, III
(74) Attorney, Agent, or Firm—Walter A. Hackler

(57) ABSTRACT

A method of temporarily protecting a surface which includes the steps of applying a continuous coating of a masking material to said surface, which masking material comprises, before drying, an aqueous solution or emulsion consisting essentially of a film-forming, carboxylic acid-containing polymer; coating all or a portion of said surface with a coating compound, said masking material preventing said coating compound from contacting said surface; and, thereafter, removing said masking material from said surface. Preferably said carboxylic acid-containing polymer is an acrylic or methacrylic acid-containing copolymer and is the sole film-forming component of the aqueous solution or emulsion.

24 Claims, No Drawings

US 6,773,746 B1

METHOD OF TEMPORARILY PROTECTING A SURFACE BY APPLICATION OF A COATING COMPOSITION HAVING A CARBOXYLIC ACID-CONTAINING POLYMER FILM-FORMING COMPONENT

FIELD OF THE INVENTION

The present invention relates to the field of protective coatings to be used during coating operations of various surfaces including surfaces of vehicles or buildings. More specifically, in one embodiment the invention provides an improved method and composition for masking selected portions of a surface, in particular a vehicle surface, from paint. In another embodiment, this invention provides methods and compositions for protecting the walls and floors of a paint spray booth from paint overspray.

BACKGROUND OF THE INVENTION

It is well known that painting operations often require masking of certain portions of the surface of the painted object to prevent overspray. For example, it is often necessary to mask trim and windows on a vehicle (e.g. a motor vehicle) from paint overspray. Also, building stucco must frequently be protected from paint or primer coats. On occasion, it is necessary to mask painted portions of a vehicle or building from paints of a different color and overspray paints of the same color. In addition, it is often desired to protect the surfaces (e.g. floors or walls) of the area (e.g. paint spray booth) in which the over coating (e.g. painting) operation is performed.

In practice, masking operations are often one of the most time consuming and, therefore, expensive parts of the painting process. In spite of attempts to develop suitable chemical masks for vehicle painting, vehicle painters continue to use primarily masking tape and paper to cover portions of a vehicle where paint is not desired. To mask the trim on a car, for example, will often require many hours of tedious labor. Furthermore, even when done carefully, defects in such paint masks allow paint to contact surfaces that are desired to be protected.

Chemical masking solutions have been proposed to the problem of protecting surfaces during coating processing operations. However, such techniques have often not found extensive use. Some of the proposed chemical masks have been unsuitable for application to portions of a vehicle or building because of damage which would potentially occur to the protected portions of the vehicle or building. Other compositions are not water-soluble which increases the difficulty and expense of removal. In addition, masks that require solvents for removal are problematic in view of the increasing regulation of disposal of solvents as environmental regulation becomes stricter with time. Other compositions are difficult to apply, difficult to remove, excessively costly, or the like.

From the above it is seen that an improved masking that is easily applied and removed, that provides good surface protection, that is economical, and whose use entails little or no environmental impact is needed.

Woodhall et al. has disclosed various masking materials based on dextrin or polyvinyl alcohol. See U.S. Pat. Nos. 5,876,791; 5,362,786; 5,411,760; 5,523,117; 5,302,413 and 5,186,978. See also U.S. Pat. No. 5,550,182 to Ely which discloses a masking material comprising polyvinyl alcohol which is at least 98% hydrolyzed. In addition, in U.S. Pat. Nos. 5,602,992 and 6,117,485 Woodhall et al. disclose masking materials based on dextrin or cellulose derivatives. Such masking materials may include acrylic emulsion polymers as thickeners, however, such emulsion polymers are reported to be alkali-swellable not water soluble.

SUMMARY OF THE INVENTION

The present invention provides a method of temporarily protecting a surface which comprises:

a) applying a continuous coating of a masking material to said surface, which masking material comprises, before drying an aqueous solution or emulsion consisting essentially of a film-forming, carboxylic acid-containing polymer;

b) coating all or a portion of said surface with a coating compound, said masking material preventing said coating compound from contacting said surface; and, thereafter c) removing said masking material from said surface. The carboxylic acid containing polymer is preferably the sole film-forming component of said solution or emulsion. More preferably said polymer is an acrylic acid or methacrylic acid-containing polymer, e.g. a water soluble acrylic acid or methacrylic acid-containing copolymer.

The method of the invention includes the steps of applying a substantially continuous film of a masking material on a vehicle (e.g. motor vehicle), building, floor, wall (e.g. spray booth floor wall or other spray booth surface) or other surface to be protected during a "coating operation" such as painting. The vehicle, building, or other surface may then be coated with a "coating compound" such as paint or any other compound which is to be applied to the surface. Finally, the masking material may be removed from the surface by washing with water thereby removing any coating compound that may be present on the masking material. These steps may be performed, for example, during an assembly line production of a vehicle or other article of manufacture.

By "coating operation" or "overcoating" it is desired to include any compound which is applied to a surface. Coating compounds include materials such as paint or other finishing materials such as lacquer, varnish, waxes and the like which adhere to the surface to which they are applied thereby forming a relatively permanent finish. Coating compounds, however, may also include compounds designed for temporary application to surfaces as in surface preparative treatments such as acids, oils, and antioxidants from which it may be necessary or desired to shield other surfaces.

By "building" it is intended to mean herein a house, warehouse, apartment, garage, store, or the like. By "vehicle" it is intended to mean herein a car, boat, plane, train, railroad car, or the like. By "substantially continuous film" it is intended to mean herein a film lacking pinholes through which paint or other materials generated during a coating operation processing could reach an underlying surface.

The masking material is, in one embodiment, a composition comprising an aqueous solution consisting essentially of a film-forming acrylic or methacrylic acid copolymer and sufficient alkali to neutralize and solubilize said copolymer in water. The masking materials preferably contain a high concentration of solids. In a particularly preferred embodiment the acrylic or methacrylic acid copolymer may comprise from about 1 percent to about 50 or 60 percent, more preferably from about 1 percent to about 50 percent and most preferably about 2 percent to about 20 percent, e.g. 2 to about 15 percent by weight, of the aqueous solution. A particularly preferred embodiment comprises about 2 to 10 percent, by weight acrylic acid copolymer.

The masking material may additionally include a surfactant. The surfactant may comprise up to about 0.1 weight percent fluorinated surfactant. The surfactant, when present, ranges up to about 5 percent, more preferably up to about 2 percent, and most preferably up to about 1 percent, by weight, of the masking composition. The surfactant may include a foam reduction or foam control agent.

The composition is formulated as an aqueous composition and thus, the remainder of the composition is preferably made up of water. Thus, water may range up to about 98 percent, more preferably up to about 95 percent, by weight, of the composition.

A particularly preferred composition for use in the method of this invention comprises 5%, by weight, of an acrylic or methacrylic acid copolymer and 92 to 94% deionized water. A water soluble alkali, e.g. sodium hydroxide, is added in an amount sufficient to neutralize and solubilize said acrylic or methacrylic acid copolymer, e.g. the pH of the composition may be 7.1 to 7.2 Ethylenediaminetetraaceticacid as an aqueous 0.9% solution, by weight, is added to control spray viscosity, wetting and chelating properties. The final viscosity of the composition is adjusted to 1400–1700 c.p.s. as measured at 25° C., with a Brookfield LFV Viscometer for optimum spray viscosity.

DETAILED DESCRIPTION OF THE INVENTION

The present invention provides an improved method and composition for protecting a vehicle (e.g. motor vehicle) or other surface subject to a coating operation such as painting. For example, certain regions of an automobile, or other surface, may be masked using the coating composition of the present invention to protect those regions from paint overspray in a painting booth.

In addition it is also often desired to protect the surfaces of the area in which an overcoating operation (e.g. painting) is performed. In particular, it is desired to protect the walls, floors and other surfaces of such an area (e.g. a painting booth) from paint overspray and spills. In addition, it is also desirable to reduce airborne dust in such areas during overcoating operations.

This invention provides compositions and methods to meet these needs. The methods entail coating the surface to be protected (e.g. surface of a car or truck or the walls and/or floors of a spray booth) with a temporary protective coating composition. One or more coating (e.g. painting) operations are performed and, when desired, the protective composition is removed.

The coating compositions of this invention, when applied to a surface (e.g. the surface of an automobile), produce a substantially continuous film that adheres well to the underlying surface. By "substantially continuous film" it is intended to mean herein a film generally lacking pinholes through which water, oil, paint, dust, or the materials could reach the underlying surface. Further, the material can be removed easily from the surface to be protected after use with a water wash, or by mechanical means such as scraping or peeling, or by combinations of these methods. In addition, because the material is fully biodegradable, it may be simply disposed of (e.g., washed down a sewer) with no substantial environmental impact.

A preferred method of protecting surfaces according to this invention includes steps of applying the coating compositions to the surface to be protected in a substantially continuous film. The compositions are then dried to form a coating that protects the underlying surface from the coating operation (e.g. paint overspray). The coating may be subsequently removed from the surface by simply washing with water when it is no longer required. In a particularly preferred embodiment, the coatings of the present invention are used to protect components of motor vehicles (e.g. automobiles or automobile finishes), and the walls and floors of spray booths or other areas or structures that may be contacted with overspray in a coating (e.g. painting) operation.

A carboxylic acid-containing, polymer, e.g. an acrylic or methacrylic acid-containing copolymer is utilized in the films of the present invention to provide solids and to build film thickness. It was an unexpected discovery of the present invention, that the use of acrylic or methacrylic acid copolymers, alone, provides masking compositions that show exceptional coating, film forming, and drying properties. In particular, the use of high concentrations of the copolymer allow the buildup of a thick coating which nevertheless shows relatively low viscosity, good coating properties and an extremely rapid drying time.

Preferably, the acrylic or methacrylic acid-containing copolymer will comprise sufficient acrylic or methacrylic acid and have a molecular weight sufficient to enable the copolymer to impart the necessary viscosity to the aqueous emulsion or solution that is used in the method of the invention. Also, preferably the acrylic or methacrylic acid-containing copolymer will form a cohesive film at room temperature, i.e. it will have a Tg of less than about 25° C. Finally, it is preferred that the acrylic or methacrylic acid-containing copolymer will contain sufficient acrylic or methacrylic acid to be solubilized by alkali in an aqueous solution. To achieve these objectives an acrylic acid or methacrylic acid monomer may be copolymerized with other acrylate monomers, e.g. ethylacrylate, butylacrylate, octylacrylate and the like. An example of suitable copolymer includes a copolymer of methacrylic acid and ethylacrylate.

The quantity and type of the acrylic or methacrylic acid copolymer in the coating composition may be optimized for a particular application. This is accomplished empirically. Generally where it is desired that the composition dry to provide a thicker final coating more solids are added to the composition. However, the upper limits to the acrylic or methacrylic acid copolymer concentration are dictated by the resulting viscosity of the composition, The viscosity of the wet coating must be low enough to permit application to and continuous coating of the surface. Thus, in order to produce a thick coating one increases the solids concentration, but not beyond a point where the composition becomes difficult or impossible to apply. Conversely, where a thin coating is desired, the solids composition may be decreased, but not to a point where the composition fails to form a continuous protective coating when dried.

To some extent, the optimal solids content of the mixture is a function of the application method. It is expected that the composition may be applied by a variety of methods known to those of skill in the art. These methods include, but are not limited to painting, dipping, spraying, reverse roller coating, and the use of doctor bars. One of skill in the art will appreciate that application by spraying will generally require a composition of lower viscosity than application by the use of doctor bars. Thus a composition intended for application by spraying may contain a lower solids concentration than a composition applied by dipping or doctoring.

The coatings of the present invention may additionally contain a surfactant. For example, the masking composition may include nonionic alkyl aryl surfactants such as Triton CF-10 and CF-12 (Rohm & Haas, Philadelphia, Pa., U.S.A.). Also suitable is Triton X-100 and surfactants having fluorinated alkyl chains such as "Flourad" products sold by Minnesota Mining and Manufacturing (St. Paul, Minn., U.S.A.) and "Zonyl" products sold by DuPont Company (Wilmington, Del., U.S.A.). In addition, many embodiments include polyethoxy adducts or modified (poly)ethoxylates such as Triton DF-12 and DF-16 sold by Union Carbide (Danbury, Conn., U.S.A.). Other surfactants include non-ylphenoxypolyethanol (such as IGEPAL CO-660 made by GAF), polyoxyalkylene glycol (such as Macol 18 and 19 made by Mazer Chemicals), acetylenic diol-based surfactants (such as Surfynol 104A made by Air Products), and the like.

To provide a continuous and level film, the masking composition should adequately wet the surface to be protected. However, many surfaces, in particular, car body finishes, are themselves highly hydrophobic or purposely treated (e.g. waxed) to have a low surface free energy so that water will bead. To facilitate wetting and thereby prevent the masking composition from beading, the surface tension of the masking composition may be lowered by the addition of a surfactant, e.g. a fluorinated surfactant.

One advantage of the compositions utilized in the method of the present invention, as compared to the dextrin or cellulosic film formers of Woodhall et al. is that thickeners and/or preservatives are not required. Because acrylic acid copolymers do not support the growth of microbes, fungi and the like, at pH below 7 no preservative is required. Moreover, since the acrylic acid or methacrylic acid copolymer, itself, is a thickening agent as well as the film forming component of the masking material no additional thickening agent is required.

Preferred embodiments of the compositions of this invention may also include components to adjust pH. Means of adjusting pH are well known to those of skill in the art. In particular, where the composition is to be used as a masking composition on an automotive finish, it is often desirable to adjust the composition to a pH of 6 to about 7. This may be accomplished by the addition of one of a number of water soluble bases well known to those of skill in the art. These include, but are not limited to sodium hydroxide, sodium bicarbonate and amine bases such as pyridine and ethylamine and ammonia.

The mask composition is an aqueous solution and therefore includes a substantial amount of water before drying. A variety of the materials may also be included in the coatings to confer specific additional properties. Thus, for example, the coating compositions may additionally include dyes or colorants, antioxidants or corrosion inhibitors, ultra-violet inhibitors, rust inhibitors and the like. Preferred embodiments may include foam reduction or foam control agents such as FoamMaker™, Bubble Breaker™, and 1 and 2 octanol. Antistatic compounds (preferably water soluble antistatics such as Larostat 264A made by Mazer Chemicals) may be added to prevent dust from being drawn to the surface. The mask composition may also include sequesterants (typically less than 1%).

The coating solutions are made by conventional means which typically comprise mixing the components of the masking material at substantially atmospheric pressure, so as to form a homogeneous solution. Heat may be applied to speed preparation of the coating solution. After formation of the homogeneous solution, the pH may be adjusted as discussed above. In a particularly preferred embodiment, the pH is adjusted to pH 7–9 by the addition of sodium hydroxide or other pH adjusting reagents.

The coating compositions are conveniently formulated as aqueous (water-based) solutions or emulsions. The aqueous formulation generally lacks toxic solvents and is therefore relatively easy to handle and work with and is readily disposed of without adverse environmental impact. Thus, it is generally desirable to avoid the inclusion of any reagents (e.g. oil, organic solvents, etc.) that impose difficulties in handling and/or disposal. Preferred coating compositions are therefore aqueous compositions substantially or completely oil free and free of organic solvents.

The coating (masking) material is applied by one of a variety of techniques known to those of skill in the art. These include painting, dipping, spraying, reverse roller coating, and the use of doctor bars. Particularly preferred techniques include brushing and spraying of the material. In one preferred embodiment the surface to be protected is blown dry of dust and debris. In some cases, additional water may be added for easier application, such as a 10% dilution. Thereafter, the masking material is applied with a pressure pot sprayer, preferably first in a thin mist and, thereafter, in a flow coat or thicker substantially continuous film. For some applications, the mist coat will not be necessary. The mask material is sprayed primarily in the surface to be protected, although overspray will not pose significant problems since any overspray may be readily removed with, for example, a wet towel or sponge.

In preferred embodiments, the resulting masking coating is applied in a wet coating in a thickness ranging from about 1 to about 10 mils, more preferably ranging from about 1 to about 4 mils, and most preferably ranging from about 1 to about 2 mils. This wet coating then dries to form a continuous dry coating ranging from about 0.5 to about 1 mil in thickness.

The masking material is typically permitted to dry at atmospheric temperatures and pressures. For a 1 to 2 mil wet thickness coating, such drying will take about 10 minutes at 70° F. and about 50% humidity.

Alternatively, the masking composition may be force-dried. Force drying may be accomplished by means well known to those of skill in the art. These include, but are not limited to the application of heat (e.g. radiant heating, oven baking, or hot air blowers), the reduction of air humidity, air movement or any combination of these means. Under forced drying conditions at about 150° F. and about 50% humidity, the same coatings will dry in about 2 minutes.

After drying of the masking composition, the remaining unprotected surface is then painted or otherwise coated without fear of overspray on the portions of the surface protected by the masking material. If the processing operation includes painting, the paint applied to the surface and allowed to thoroughly dry. Such drying times will vary radically depending upon the particular type of paint utilized.

After drying of the paint, the masking material is removed from the protected surface. Such removal operations may include, for example, peeling or scraping of the material off of the protected surface. However, it is most preferred that the masking composition be removed by normal washing with water. Pressure washing with water may be desired in some instances. The material will be removed readily since it is easily miscible or soluble in water.

One of skill in the art will readily appreciate that the steps of applying and drying the masking composition, applying and drying the paint or other subsequent coating, and removing the masking coating may be easily set up for mass production, as in an assembly line.

EXAMPLE

The following example is intended to illustrate the present invention and are not intended to limit the scope of the invention in any way.

EXAMPLE 5 parts, by weight, of a 28%, by weight acrylic emulsion comprising a copolymer of methacrylic acid and ethylacrylate are diluted with 93.8 parts water, 0.3 parts of a 50% NaOh and 0.9 parts of a 39% solution of ethylenediamine tetra acetic acid in water to provide an aqueous solution of a masking material having a viscosity of 1400 to 1700 c.p.s.

The coating is applied, by spraying, to an automotive body panel test surface thereby masking a portion of the test surface. The coatings is then either air dried or force-dried by heating.

The masked test panel is then sprayed with an automotive body paint and allowed to dry. The coating compositions are then removed from the masked portion of the panel by simply washing the panel with water.

The coating generally provide uniform wetting of the test surface. The coating dries rapidly, typically a 1 mil layer drying in about 21 minutes at ambient temperature (approximately 60° F. and 50% humidity).

The coating is easily removed by the application of pressurized water and the masked regions show little or no penetration by the paint.

The above description is illustrated and not restrictive. Many variations of the invention will be apparent to those of skill in the art upon review of this disclosure. Merely by way of example, while the invention is illustrated with regard to particular brands of materials used in the mask, the invention is not so limited. The scope of the invention should, therefore, be determined not with reference to the above description, but instead should be determined with reference to the appended claims along with their full scope of equivalents.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

What is claimed is:

1. A method of temporarily protecting a portion of a surface which is to be coated with a coating compound, which comprises:
   a) applying a continuous coating of a masking material to a portion of said surface, which masking material comprises, before drying, an aqueous solution or emulsion consisting essentially of a film-forming, carboxylic acid-containing polymer;
   b) coating said surface with a coating compound, said masking material preventing said coating compound from contacting said portion of said surface which is protected by said masking material; and, thereafter,
   c) removing said masking material from said surface, wherein said masking material comprises sufficient alkali to neutralize and solubilize said polymer.

2. The method of claim 1, wherein said polymer is an acrylic or methacrylic acid-containing copolymer.

3. The method of claim 2 wherein said acrylic or methacrylic acid containing copolymer is a water soluble copolymer.

4. The method of claim 1 wherein said surface is the surface of a motor vehicle.

5. The method of claim 1 wherein said masking material comprises ethylenediaminetetraaceticacid.

6. The method of claim 1 wherein the pH of said solution or emulsion is about 7.1.

7. The method of claim 1 wherein said solution or emulsion has a viscosity of between about 1400 and 1700 c.p.s.

8. The method of claim 1 wherein said aqueous solution or emulsion comprises from about 2 to about 10, weight percent, of said polymer.

9. The method of claim 8 wherein said aqueous solution or emulsion comprises about 5 weight percent of said polymer.

10. The method of claim 1 wherein said polymer is a copolymer of methacrylic acid and ethylacrylate.

11. The method of claim 1 wherein said masking material is removed with water.

12. The method of claim 1 wherein said masking material is removed by the application of pressurized water.

13. A method of temporarily protecting a portion of a surface which is to be coated with a coating compound, which comprises:
    a) applying a continuous coating of a masking material to a portion of said surface, which masking material comprises, before drying, an aqueous solution or emulsion comprising, as the sole film-forming component, a carboxylic acid-containing copolymer;
    b) coating said surface with a coating compound, said masking material preventing said coating compound from contacting said portion of said surface which is protected by said masking material; and, thereafter,
    c) removing the masking material from said surface, wherein said masking material comprises sufficient alkali to neutralize and solubilize said polymer.

14. The method of claim 13, wherein said copolymer is an acrylic or methacrylic acid-containing copolymer.

15. The method of claim 14 wherein said acrylic or methacrylic acid-containing copolymer is a water soluble copolymer.

16. The method of claim 15 wherein said surface is the surface of a motor vehicle.

17. The method of claim 13 wherein said masking material comprises ethylenediaminetetraaceticacid.

18. The method of claim 13 wherein the pH of said solution or emulsion is about 7.1.

19. The method of claim 13 wherein said solution or emulsion has a viscosity of between about 1400 and 1700 c.p.s.

20. The method of claim 13 wherein said aqueous solution or emulsion comprises from about 2 to about 10 weight percent, of said copolymer.

21. The method of claim 20 wherein said aqueous solution or emulsion comprises about 5 weight percent of said copolymer.

22. The method of claim 13 wherein said copolymer is a copolymer of methacrylic acid and ethylacrylate.

23. The method of claim 13 wherein said masking material is removed with water.

24. The method of claim 13 wherein said masking material is removed by the application of pressurized water.

* * * * *